US012518885B2

(12) United States Patent
Barberis et al.

(10) Patent No.: US 12,518,885 B2
(45) Date of Patent: Jan. 6, 2026

(54) TUBULAR COMPONENT OF PRESSURISED WATER NUCLEAR REACTOR, AND METHOD FOR MANUFACTURING SAID COMPONENT

(71) Applicant: FRAMATOME, Courbevoie (FR)

(72) Inventors: Pierre Barberis, Ugine (FR); Philippe Legrand, Pornichet (FR)

(73) Assignee: FRAMATOME, Courbevoie (FR)

( * ) Notice: Subject to any disclaimer, the term of this patent is extended or adjusted under 35 U.S.C. 154(b) by 769 days.

(21) Appl. No.: 17/623,701

(22) PCT Filed: Jul. 3, 2020

(86) PCT No.: PCT/EP2020/068839
§ 371 (c)(1),
(2) Date: Dec. 29, 2021

(87) PCT Pub. No.: WO2021/004943
PCT Pub. Date: Jan. 14, 2021

(65) Prior Publication Data

US 2022/0254522 A1 Aug. 11, 2022

(30) Foreign Application Priority Data

Jul. 5, 2019 (FR) ................................ FR 19 07524

(51) Int. Cl.
*G21C 3/07* (2006.01)
*C22C 16/00* (2006.01)
(Continued)

(52) U.S. Cl.
CPC ................ *G21C 3/07* (2013.01); *C22C 16/00* (2013.01); *C22F 1/186* (2013.01); *G21C 21/00* (2013.01)

(58) Field of Classification Search
CPC .......... G21C 3/07; G21C 21/00; C22C 16/00; C22F 1/186
See application file for complete search history.

(56) References Cited

U.S. PATENT DOCUMENTS 2,059,583 A * 11/1936 Jackson ............... B24D 11/001 451/529
6,261,516 B1 7/2001 Jeong et al.
(Continued)

FOREIGN PATENT DOCUMENTS

JP H10260280 A 9/1998
WO WO9705628 A1 2/1997
(Continued)

OTHER PUBLICATIONS

Buj-Corral et al. ("Roughness evolution of previously milled samples along a polishing test." Materials and Manufacturing Processes 31.5 (2016): 612-619.) (Year: 2016).*
(Continued)

*Primary Examiner* — Ricardo D Morales
(74) *Attorney, Agent, or Firm* — Davidson Kappel LLC

(57) ABSTRACT

A tubular component for a pressurised-water nuclear reactor, has the following composition by weight:
0.8%≤Nb≤2.8%;
traces≤Sn≤0.65%;
0.015%≤Fe≤0.40%; preferably 0.020%≤Fe≤0.35%;
traces≤C≤100 ppm;
600 ppm≤O≤2300 ppm; preferably 900 ppm≤O≤1800 ppm;
5 ppm≤S≤100 ppm; preferably 8 ppm≤S≤35 ppm;
traces≤Cr+V+Mo+Cu≤0.35%;
traces≤Hf≤100 ppm;
F≤1 ppm;
the remainder being zirconium and impurities resulting from production. The tubular component has an outer surface with a roughness Ra less than or equal to 0.5 μm, obtained following a final mechanical polishing step. The outer surface has a roughness Rsk≤1 in absolute value and a roughness Rku≤10.

20 Claims, 3 Drawing Sheets

Mass increase (mg/cm²)

Typical LOCA duration (1800s)

Start of breakaway (5000s)

Residence time (s½)

(51) Int. Cl.
*C22F 1/18* (2006.01)
*G21C 21/00* (2006.01)

(56) References Cited

U.S. PATENT DOCUMENTS

2002/0083760 A1* 7/2002 Morris ............... G01N 33/2805
73/61.76
2008/0080660 A1* 4/2008 Barberis ................ C22C 16/00
148/672

FOREIGN PATENT DOCUMENTS

WO WO0124193 A1 4/2001
WO WO2006027436 A1 3/2006

OTHER PUBLICATIONS

Akhiani et al. ("Effect of surface roughness on the texture and oxidation behavior of Zircaloy-4 cladding tube". Applied Surface Science 285P (2013) 832-839) (Year: 2013).*
Corresponding Search Report for PCT/EP2020/068839.
Corresponding Search Report for FR 19 07524.

* cited by examiner

TUBULAR COMPONENT OF PRESSURISED WATER NUCLEAR REACTOR, AND METHOD FOR MANUFACTURING SAID COMPONENT

The present disclosure concerns the field of manufacturing zirconium-alloy elements for pressurised-water nuclear reactors, in particular structural tubes and cladding tubes for fuel for rods in nuclear fuel assemblies.

BACKGROUND

Various zirconium alloys—tertiary or quaternary (i.e. having two or three principal alloy elements in addition to Zr, respectively)—the composition of which may be coupled to a particular thermomechanical treatment and/or finishing method allowing the product they form to be given increased corrosion resistance characteristics, are offered to users in order to produce pressurised-water nuclear reactor components. These alloys are used, inter alia, for structural components (gratings, guide tubes, and, where applicable, instrumentation tubes) and cladding tubes for fuel pellets, also known as sheaths, in nuclear fuel assemblies. These alloys must withstand various forms of corrosion that may occur during the normal operation of the reactor, as well as good resistance to corrosion in accident conditions, in particular in the event of coolant loss (Loss Of Coolant Accident, LOCA), i.e. at very high temperatures (above 900° C.) and in a water-vapour atmosphere.

It is known that high surface roughness on tubes for nuclear fuel assemblies degrades their corrosion resistance in the reactor.

Document WO-A-2006/027436, for example, has shown that a final mechanical polishing step of the outer surface of a cladding tube, which gives it a roughness Ra less than or equal to 0.5 μm, coupled with a zircon alloy composition containing, in addition to zirconium and impurities resulting from production, 0.8-2.8% Nb, 0.015-0.40% Fe, 600-2300 O, 5-100, and, optionally, a small amount of Sn, Cr, or V, and a method for producing the tube, allowed for an improvement in the tube's corrosion resistance at high temperatures, in particular at the temperatures that may be found in the event of a LOCA. The need to limit the Hf and F content of the alloy to the extent possible is also affirmed, and the final mechanical polishing step allows for any trace F, which might result from pickling in a fluorinated bath, to be removed from the surface, whilst obtaining the desired roughness Ra.

The behaviour of a zirconium-alloy tube in the event of a LOCA is evaluated, for example, by means of oxidation testing a sample of the tube in a water-vapour environment at a temperature of 1000° C. Such a test is described, e.g., in the paper 'AREVA NP M5® Cladding Benefits for Proposed U.S. NRC RIA and LOCA Requirements' presented in September 2016 at the LWR Fuels with Enhanced Safety and Performance Meeting (TopFuel 2016).

The corrosion kinetics, measured by the increase in the mass of the sample resulting from oxidation, is initially parabolic in nature. A deterioration of the kinetics (commonly known in the field as 'breakaway') will occur after a certain test duration due to accelerated corrosion and/or significant hydrogen absorption ('hydride cracking') (typically hydrogen absorption in excess of 200 ppm).

The hydride cracking of a zirconium-alloy component degrades its mechanical and microstructural properties, and may result in deformation or breakage, in whole or in part, e.g. due to cracking, followed by local bursting in the case of a cladding tube for a nuclear fuel rod.

In absolute terms, tubes according to the recommendations of document WO-A-2006/027436 have good corrosion resistance in accident conditions, with breakaway occurring after approximately 5000 s, compared to approximately 1800 s in the case of more commonly used alloys.

SUMMARY

However, if an even greater delay of the occurrence of breakaway could be obtained, this would represent a fundamental advantage for nuclear reactor safety in the event of accidents.

The objective of the present disclosure is to propose a method that will allow for tubes for nuclear fuel assemblies for pressurised-water reactors with improved corrosion and hydride cracking resistance compared to known-art alloys, in particular M5 alloys, in particular in the event of exposure to very high temperatures in accident conditions such as LOCA, to be reliably obtained.

To this end, the present disclosure concerns a tubular component for a pressurised-water nuclear reactor, the composition by weight of which consists of:

- 0.8%≤Nb≤2.8%;
- traces≤Sn≤0.65%;
- 0.015%≤Fe≤0.40%; preferably 0.020%≤Fe≤0.35%;
- traces≤C≤100 ppm;
- 600 ppm≤O≤2300 ppm; preferably 900 ppm≤O≤1800 ppm;
- 5 ppm≤S≤100 ppm; preferably 8 ppm≤S≤35 ppm;
- traces≤Cr+V+Mo+Cu≤0.35%;
- traces≤Hf≤100 ppm;
- F≤1 ppm;

the remainder being zirconium and impurities resulting from production, the outer surface of which has a roughness Ra less than or equal to 0.5 μm, obtained following a final mechanical polishing step, characterised in that its outer surface has a roughness Rsk≤1 in absolute value and a roughness Rku≤10.

The outer surface of the component may have a roughness Ra less than or equal to 0.3 μm, resulting from the final mechanical polishing step.

The outer surface of the component may have a roughness Rsk≤0.75 in absolute value and a roughness Rku≤9.

The present disclosure also concerns a method for producing a fuel cladding tube for a nuclear reactor, characterised in that:

- a zirconium-alloy ingot having the following composition by weight is prepared:
- 0.8%≤Nb≤2.8%;
- traces≤Sn≤0.65%;
- 0.015%≤Fe≤0.40%; preferably 0.020%≤Fe≤0.35%;
- traces≤C≤100 ppm;
- 600 ppm≤O≤2300 ppm; preferably 900 ppm≤O≤1800 ppm;
- 5 ppm≤S≤100 ppm; preferably 8 ppm≤S≤35 ppm;
- traces≤Cr+V+Mo+Cu≤0.35%;
- traces≤Hf≤100 ppm;
- F≤1 ppm;

the remainder being zirconium and impurities resulting from production;

- the ingot is subjected to forging, optionally followed by quenching, then extrusion and thermomechanical treatments including cold rolling separated by intermediate annealings, wherein all intermediate annealings are carried out at a temperature below the transus temperature $\alpha \rightarrow \alpha+\beta$ of the alloy, ending with relief, semi-recristallisation or recristallisation annealing, and resulting in the production of a tube;

optionally, chemical pickling and/or electrolytic polishing and/or initial mechanical polishing of the outer surface of the tube are carried out;

and final mechanical polishing of the outer surface to give it a roughness Ra less than or equal to 0.5 μm, a roughness Rsk≤1 in absolute value, and a roughness Rku≤10 is carried out.

Intermediate annealing may be carried out at temperatures no greater than 600° C.

The final mechanical polishing step may be carried out with a finishing roller.

The final mechanical polishing step may be carried out by means of abrasion with an abrasive paste.

The final mechanical polishing may be carried out by a method selected from: honing, abrasive paste extrusion, abrasion using a polishing felt or sheet impregnated with abrasive paste.

The final mechanical polishing step may be carried out by roller burnishing.

As has been made clear, the present disclosure consists of producing a tubular component for a pressurised-water nuclear reactor, in particular a structural tube, i.e. a guide or instrumentation tube, from a tube made of a Zr—Nb alloy with 0.8-2.8% Nb, also containing a small amount of Fe and S, as well as Sn, Cr, V, Mo, and/or Cu, and having an O content that may be relatively high, and prepared by the method described in WO-A-2006/027436, with the possible exception of the post-forging quenching, which is not strictly necessary with Zr—Nb alloys. After having subjected it to thermal treatments adequate to give it the desired mechanical properties, and, preferably, a chemical pickling step (generally carried out before the final thermal treatment), the outer surface of the tube is polished by a method allowing for a particular surface finish, defined not only by its Ra value, but also by the Rsk and Rku values to be obtained as a result of a mechanical polishing operation ('final mechanical polishing'). These requirements serve to ensure that the outer surface of the tube will have a morphology that will render it as insensitive as possible to corrosion and/or hydride cracking in accident situations, in particular in the event of LOCA.

Other polishing operations, which may not necessarily all be mechanical, may precede the final mechanical polishing step that results in the type of roughness according to the present disclosure, thus constituting the main step of the method according to the present disclosure. In the following, 'initial polishing' will refer to a polishing step that merely constitutes an intermediate step on the way to obtaining the desired roughness, and 'final polishing' will refer to the last polishing step, which results in the desired roughness.

It goes without saying that, if a single mechanical polishing operation is carried out during the treatment according to the present disclosure of the surface of the product, this operation will constitute the 'final mechanical polishing' step. This final mechanical polishing step may be followed by other production steps, e.g. inspection, degreasing, etc., but none of the other steps must result in surface contamination, in particular with halogens, or a degradation of its roughness.

Based on its composition, in particular the alloy produced by Framatome, known by the brand names 'M5' or '$M5_{Framatome}$' falls within the scope of the present disclosure.

BRIEF SUMMARY OF THE DRAWINGS

The present disclosure will be better understood based on the following direction, with reference to the following appended drawings.

DETAILED DESCRIPTION

Figure 1:
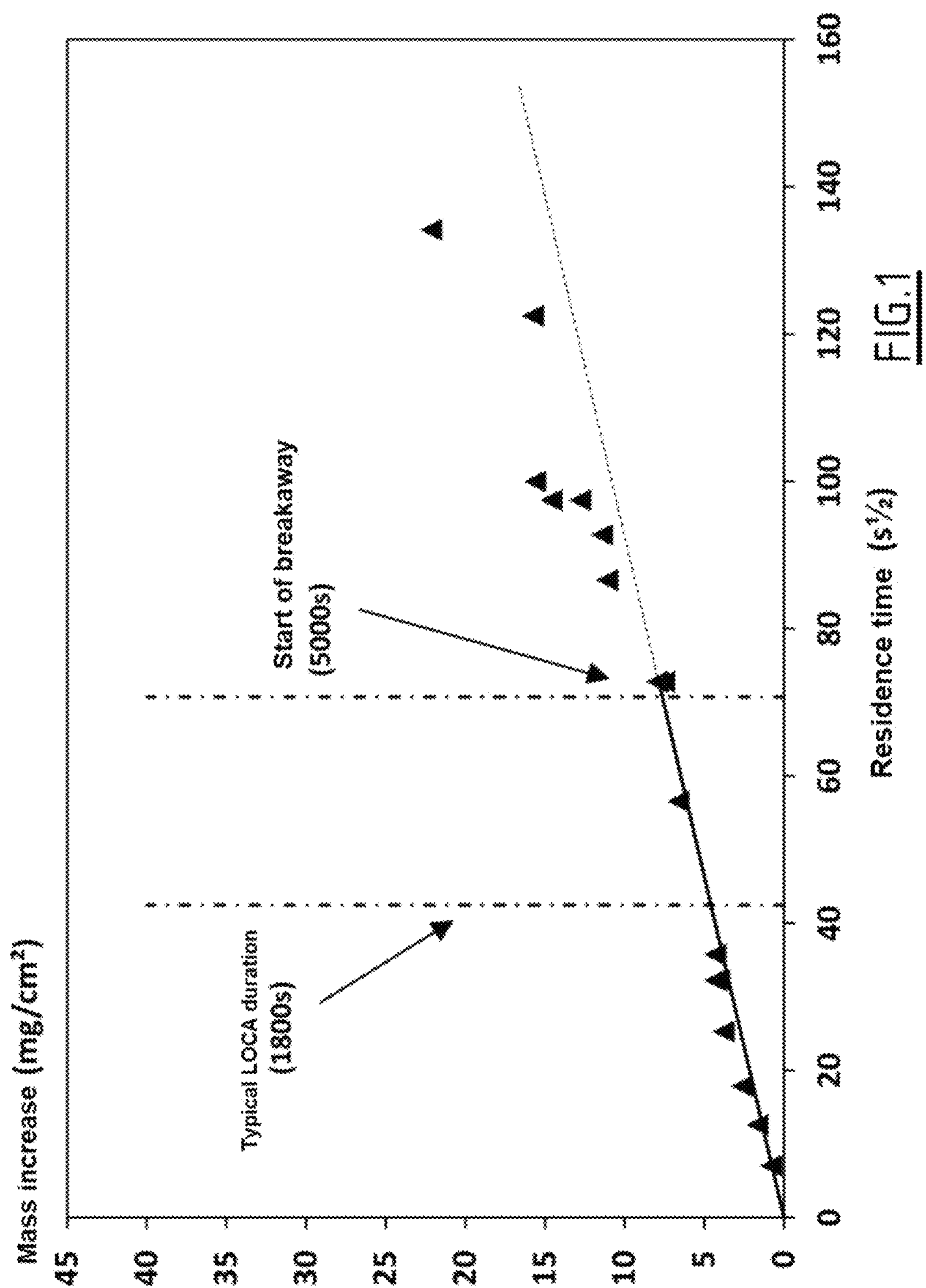
FIG. 1, showing the increase in mass of reference samples of a Zr—Nb alloy ($M5_{Framatome}$) consistent with the composition and Ra requirements of WO-A-2006/027436 as a function of the square root of the time spent at a temperature of 1000° C. in a water vapour environment.

The behaviour of a tube during a LOCA test as described above depends on the roughness of the outer surface, which is most commonly described solely based on the Ra parameter as defined in standard NF EN ISO 4287. This corresponds, over a given evaluation length ('base length') to the arithmetical mean deviation of the roughness profile of the surface, which includes protrusions and cavities of varying heights relative to the mean line of the roughness profile. Ra constitutes an evaluation of the mean of the absolute values of the heights. Ra is calculated by the following formula:

$$Ra = \frac{1}{lr}\int_0^{lr} \left| Z(x) \right| dx$$

where lr is the base length of the roughness profile and Z(x) is the ordinate (or height) of the roughness profile for an abscissa x on the mean line of the roughness profile. It should be noted that the origin of the height is the mean value of the roughness profile, and that, accordingly, the integral of Z(x) taken from 0 to lr is nil.

In fact, however, the experience of the inventors has shown that the parameter Ra is insufficient in order to fine-tune the behaviour of the alloy in conditions likely to give rise to significant oxidation and/or hydride cracking of the tube, and, in particular, to explain the very good behaviour observed when the outer surface thereof has been treated according to the present disclosure.

The inventors have found that two parameters, defined in standard NF EN ISO 4287, were also of particular importance in solving the problem presented. These parameters are Rsk ('skewness') and Rku ('kurtosis').

The parameter Rsk defines the asymmetry of the roughness profile evaluated. It translates the asymmetrical height distribution relative to the mean line of the roughness profile, defined based on the base length lr. It provides information on the morphology of the surface state. A nil Rsk value corresponds to a normal (Gaussian) distribution of heights about the mean line. A positive Rsk value corresponds to a 'hollow' profile with a height distribution biased towards higher values, e.g. in the case of a plateau surface with a preponderance of protrusions. A negative Rsk value corresponds to a 'full' profile with a height distribution lower towards higher values, e.g. in the case of a plateau surface with a preponderance of cavities. Rsk is calculated by the following formula:

$$Rsk = \frac{1}{Rq^3}\left[\frac{1}{lr}\int_0^{lr} Z^3(x)dx\right]$$

in which Rq is the mean quadratic deviation of the profile evaluated over the base length lr according to:

$$Rq = \sqrt{\frac{1}{lr}\int_0^{lr} Z^2(x)dx}$$

Rq corresponds to the quadratic mean of the heights over the base length lr.

The parameter Rku defines the kurtosis of the roughness profile under evaluation, i.e. the breadth of the height distribution relative to the mean line of the roughness profile, defined based on the base length lr. It provides information on the morphology of the surface state. An Rsk value equal to 3 corresponds to a normal (Gaussian) height distribution. An Rku value greater than 3 corresponds to a 'dense' profile relative to the normal distribution, i.e. predominantly having heights with low absolute value relative to the mean line of the roughness profile. An Rku value less than 3 corresponds to a 'staggered' profile relative to the normal distribution, i.e. with a greater proportion of heights far from the mean line, e.g. with heights equally distributed over the entire span. Rku is calculated by the following formula:

$$Rku = \frac{1}{Rq^4}\left[\frac{1}{lr}\int_0^{lr} Z^4(x)dx\right]$$

In particular, Rsk and Rku are used in tribology to evaluate the contact, wear resistance, and lubrication properties of the surface measured, but they are not used to evaluate the corrosion resistance of a surface.

The inventors have found that, all things being equal, if the parameters Rsk (skewness) and Rku (kurtosis) of the outer surface of the tube meet certain criteria, the oxidation kinetics in accident conditions, in particular in the event of LOCA, remains parabolic over the duration of the test. Otherwise, oxidation accelerates over the course of the test.

The macroscopic surface constraints caused by oxidation alone cannot explain the difference in behaviour observed on samples of tubes with delayed—or no—breakaway over the duration of the test. The hypothesis advanced by the inventors to explain this difference in behaviour is that the constraints could also have a local effect on oxidation on the level of surface roughness. A surface with numerous pronounced protrusions may have an increased risk of cracking of the oxide perpendicular to the oxide-metal interface, and locally accelerated oxidation at the location of the protrusions.

The desired surface is a polished surface ($Ra \leq 0.5$ μm, preferably $\leq 0.3$ μm) having a substantially symmetrical roughness distribution, i.e. a skewness factor Rsk near nil in absolute value: $|Rsk| \leq 1$ and preferably $|Rsk| \leq 0.75$, and no pronounced protrusions or cavities, which translates into a kurtosis factor Rku less than or equal to 10, preferably less than or equal to 9.

The improved behaviour observed may be obtained reproducibly by carrying out careful mechanical surface finishing, which allows the desired roughness to be obtained in the outer surface of the tube.

Because this finish can be obtained by various means, they will not be described exhaustively herein.

One possible manner of obtaining this finish consists of successively polishing the tube with silicon carbide SiC rollers of increasing grain sizes (e.g. up to grain 240 mesh or more according to ISO 8486-2), with these operations constituting an initial mechanical polishing step, and ending with a final polishing step using a finishing roller such as a rolled finishing wheel, a radial brush, a flap disk with a very fine grain, e.g. a Scotch Brite™ finishing roller. This method of finishing allows for tubes to be obtained that, at a minimum, have delayed breakaway, i.e. occurring after more than 10,000 seconds, for an alloy having a composition and method of preparation prior to the final polishing step that are substantially consistent with those set forth in WO-A-2006/027436.

The initial polishing step may also comprise non-mechanical polishing (e.g. chemical or electrolytic polishing), used alone or in combination with mechanical polishing. This initial polishing step is then followed by a final mechanical polishing operation.

If experience shows that a single mechanical polishing step allows the desired roughness to be obtained in the product in question, it is possible to carry out only a single mechanical polishing step, which will be termed a 'final mechanical polishing' step because it does constitute the last polishing operation carried out on the surface of the product.

The mechanical polishing steps and the means used for these steps, in particular for the final mechanical polishing step, may be determined with providers of this type of equipment based on a specification, which conventionally includes the desired final roughness and the method for evaluating it. This will also specify the polishing materials that should be avoided as potentially harmful or difficult to remove, in particular those listed in applicable documents such as the RCC-C (Design and Construction Rules for Fuel Assemblies of PWR Nuclear Power Plants) published by AFCEN (Association Francaise pour les Règles de Conception, de Construction et de Surveillance en Exploitation des Matériels des Chaudières Electro-Nucléaires).

The exact parameters of the mechanical polishing processes, initial and final where applicable, that allow for the type of roughness desired may be determined experimentally by persons skilled in the art by means of a standard test series. To this end, it will be necessary to correlate the polishing means to be used, as well as their use parameters, with the composition of the tube and the thermomechanical treatments to which it has been subjected, as well as any chemical pickling and/or electrolytic polishing that may have preceded the mechanical polishing step(s). In particular, all things being equal, these characteristics affect the hardness and the state of the outer surface of the tube before the mechanical polishing step(s), and may also play a role in the result of the final mechanical polishing step.

This method for surface finishing the tube to obtain the fuel sheath according to the present disclosure is thus applied to a zirconium-alloy tube, which may contain impurities resulting from production, the composition by weight and method of preparation are as follows for the reasons stated in WO-A-2006/027436.

Its Nb content is 0.8-2.8%.

Its Sn content ranges from trace (in other words, a content equal to nil or just barely above nil, resulting merely from the production of the alloy without any intentional addition of the element in question) to 0.65%. The normal detection limit of this element is approximately 30 ppm, and it should be understood that the Sn content may go down to values corresponding to mere traces as defined above (thus including a value that would be strictly nil).

Its Fe content is at least 0.015%, preferably at least 0.02%, and no more than 0.40%, preferably no more than 0.35%.

Cr, V, Cu, or Mo may be optionally present in order to supplement or supplant part of the Fe, provided that the sum of their content does not exceed 0.35%.

The C content of the alloy may not exceed 100 ppm.

The alloy contains between 600 and 2300 ppm O, preferably between 900 and 1800 ppm.

The S content must be kept between 5 and 100 ppm, preferably between 8 and 35 ppm.

The presence of Hf in the alloy should be avoided. Hf content should be very low, such that, in the final alloy, no more than 100 ppm Hf, preferably no more than 75 ppm Hf is present. Particular attention should be paid to separating Hf during the preparation of the Zr sponge from which the alloy is produced.

Any F in the alloy should be limited to no more than 1 ppm.

Another very important requirement is the absence of fluorides on the alloy surface.

As noted in WO-A-2006/027436, in order to obtain a structural or cladding tube with improved corrosion and hydride cracking resistance in the case of a LOCA, it is absolutely indispensable to use surface preparations that result in radical elimination of fluorides. From this point of view, the mechanical polishing subsequent to chemical pickling is the most suitable method for preparing the tube surface before use.

Furthermore, there is the risk that the highly precise requirements for the roughness characteristics of the outer surface of the final tubular product, which are not limited to a maximum Ra value, will not be easily met by means of chemical polishing. Thus, it is necessary to carry out at least the final step of preparation of the tube surface in the form of polishing by mechanical means, e.g. by the method described above, examples of which will be provided below.

The preparation of tubes from the ingot resulting from the production of the alloy is carried out by a method including forging, optionally followed by quenching, spinning, and cold rolling steps separated by intermediate annealing steps, with all annealing being carried out at a temperature below the transus temperature $\alpha \rightarrow \alpha+\beta$ of the alloy, thus generally below 600° C. These relatively low-temperature thermal treatments allow for good corrosion resistance under normal operating conditions, and include a final relief annealing, semi-recystallisation, or recrystallisation step, depending on the microstructure desired for the final product. This may differ for the various categories and different uses of the tubes falling within the scope of the present disclosure. For example, recrystallisation is advisable if good stress resistance is desired for the tube.

Generally, in industrial practice, it is advisable to carry out 3, 4, or 5 cold rolling passes, separated by intermediate annealing steps each carried out at a temperature between 500 and 580° C., e.g. between 1 h at 500° C. and 12 h, or 24 h, at 580° C.

Another necessary condition for solving the problem presented is that the outer surface of the tube is given very low roughness Ra, less than or equal to 0.5 μm, preferably less than 0.3 μm.

WO-A-2006/027436 advises obtaining a roughness level Ra this low. However, according to the present disclosure, two other conditions are necessary in order to further optimise the LOCA behaviour of the alloy in question:

A Rsk value in absolute value less than or equal to 1 (thus between −1 and +1), preferably less than or equal to 0.75 in absolute value (thus between −0.75 and +0.75);

And an Rku value less than or equal to 10, preferably less than 9.

The present disclosure seeks to obtain a significant extension of the period in which no breakaway is observed for Zr—Nb alloy tubes including the $M5_{Framatome}$ alloy.

To this end, samples of cladding tubes (9.5 mm in diameter and 0.57 mm thick) were tested for various compositions and outer surface roughness configurations, obtained, in particular, by means of final polishing steps of various types that will be discussed in detail below.

The Zr used for the production of the tubes was obtained by conventional methods in the form of a sponge or low-Hf electrolytic crystals (less than 100 ppm in the alloy). Following sufficient smelting to allow for the elimination of any residual fluorine (F<1 ppm in the finished tube), a conventional method for transforming the ingot to obtain cladding tubes, guide tubes, or instrumentation tubes for pressurised-water nuclear reactors was used: forging, optional quenching, pilgering in 3-5 passes with intermediate annealing steps at a temperature below the transus temperature $\alpha \rightarrow \alpha+\beta$. With the exception of quenching, which was not systematically carried out, this method is identical to that described in WO-A-2006/027436, in particular as regards the optional pickling and internal polishing steps.

Figure 2:
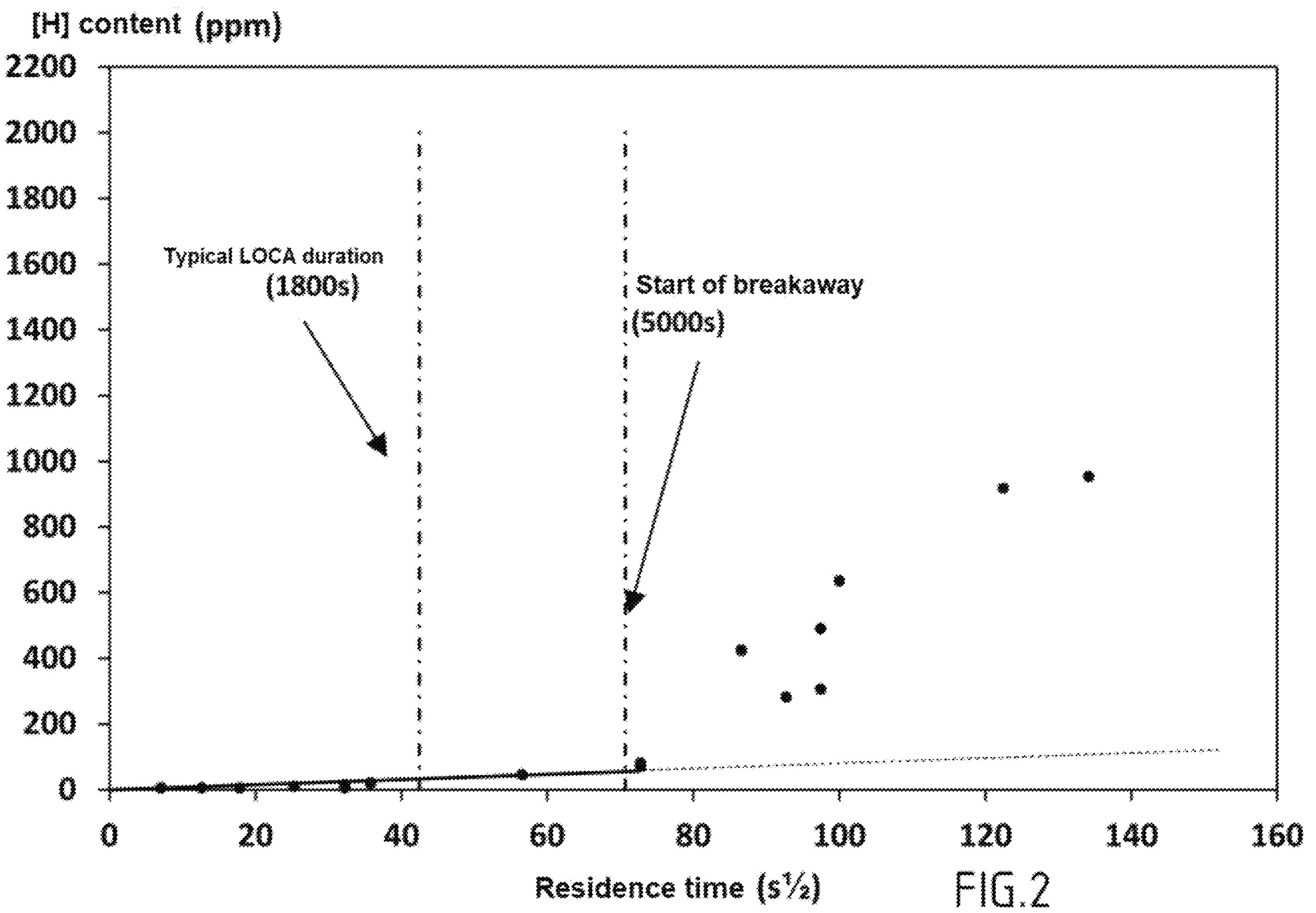
FIG. 2 shows the development of the hydrogen content of the same reference samples as a function of the square root of the time spent at a temperature of 1000° C. in a water vapour environment.
Figure 3:
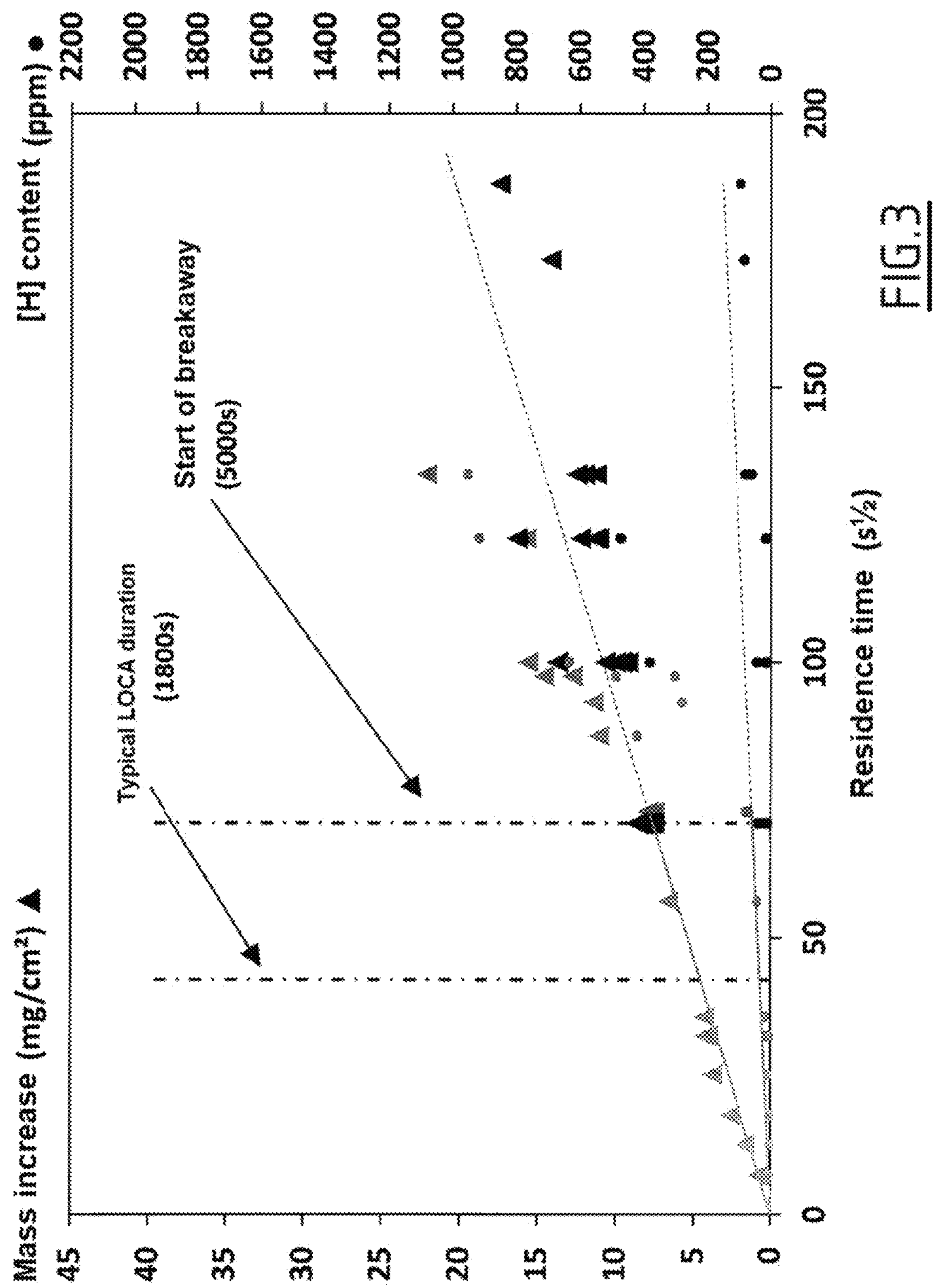
FIG. 3 shows the increase in mass and hydrogen content of the same reference samples and of samples according to the present disclosure as a function of the square root of the time spent at a temperature of 1000° C. in a water vapour environment.

Table 1 shows the compositions of 8 samples of these $M5_{Framatome}$ alloy tubes, the manufacturing variants used, as well as their increases in mass and their hydrogen content, in connection with FIGS. 1 and 2 and/or FIG. 3. All tubes are in the recrystallised state, and were pickled prior to the first thermal treatment.

FIGS. 1 and 2 show the behaviour of reference samples of $M5_{Framatome}$ tubes consistent with the composition requirements of WO-A-2006/027436, having the following composition, in a water vapour environment at 1000° C. (oxidation test as described in the TopFuel 2016 cited supra): Zr; 1.02% Nb; between 200 and 1000 ppm Fe; between 1000 and 1500 ppm O; between 5 and 35 ppm S, and less than 1 ppm F, roughness Ra below 0.5, but not consistent with the present disclosure in terms of the roughness Rsk, with values in certain cases in the ranges [−1.65; −1] or [+1; +1.48], and/or roughness Rku with values in some cases in the range [10; 15.55].

FIG. 1 shows the increases in mass (due to oxidation) as a function of the square root of the residence time in the environment in question, and FIG. 2 shows the development of the hydrogen content as a function of the square root of the residence time in the environment in question (NB: Given that the square root of the residence time is reported on the abscissa axis, the curves are significantly flatter than they would be if the abscissa axis represented residence time).

Based on standard criteria, the reference samples have good corrosion and hydride cracking resistance in accident conditions, with breakaway occurring after approximately 5000 s, which results in rapid acceleration of oxidation (FIG. 1) and hydride cracking (FIG. 2), as shown by the position of the experimental points, which are consistently above the extensions (dotted line) of the regression lines representing the increase in mass (FIG. 1) and H content (FIG. 2) before breakaway occurs. Typically, as shown in FIGS. 1 and 2, the duration for which a fuel sheath is subjected to LOCA is 1800 s, but the sheath must be able to withstand longer exposures.

In order to simplify the description, only 4 reference samples out of those tested are shown in table 1: samples 1, 4, 5, and 7.

For all samples in table 1, the nominal compositions are indicated as regards the main alloy elements. They all contain 1.0% Nb and an Fe content between 0.02 and 0.07%. All tubes tested comprised less than 100 ppm C and Hf and less than 1 ppm fluorine. All elements not mentioned are, at most, present in trace amounts.

The tubes of samples 1-8 all underwent 4 rolling passes with 2 h intermediate annealing at 580° C.

Table 1 also shows the results of measurements of Ra, Rku, and Rsk roughness carried out using a Mitutoyo SV2000 roughometer on these cladding tubes. These roughness values were obtained with various finishing means. The measurements were carried out in accordance with the applicable standard. For example, for polishing marks running tangential to the cladding tube, the measurements were carried out on tube generators over a length of 4 mm with a cut-off of 0.8 mm. Three measurements were carried out on each of the tubes; the mean and the standard deviation of these measurements are shown in table 1.

equal to that of tube 2 (itself consistent with the invention in all respects) from the same batch, which underwent the same polishing steps with silicon carbide rollers of increasing grain up to a grain size of 240 (initial mechanical polishing), followed by final mechanical polishing with the finishing roller.

Tube 3 (consistent with the present disclosure), from a different lot to tubes 1 and 2, with a somewhat increased Fe content, underwent the same polishing steps as tube 2, except that the initial mechanical polishing was carried out with SiC strips of increasing grain (up to a grain size of 240) in lieu of polishing with silicium carbide rollers of increasing grain. Tube 4, from the same batch, underwent the same polishing steps with SiC strips of increasing grain (initial polishing) as tube 3 up to a grain size of 240 (final mechanical polishing). It did not undergo the final polishing step with the finishing roller, unlike tube 3, and it is not consistent with the present disclosure because its Rsk value is somewhat too high.

Tube 5, from another batch with an even higher iron content, did not undergo the initial mechanical polishing steps with rollers or strips, but with blasting with SiC grains of decreasing size. It underwent final mechanical polishing by blasting with SiC 240 grains. Tube 6, from the same batch, was additionally polished by rubbing with a polishing

TABLE 1

Composition, manufacturing variant, mass increase, hydrogene content, and roughness of tubes 1-8

| Tube | 1 | 2 | 3 | 4 | 5 | 6 | 7 | 8 |
|---|---|---|---|---|---|---|---|---|
| Composition | Zr 1.0Nb 0.02Fe | Zr 1.0Nb 0.02Fe | Zr 1.0Nb 0.05Fe | Zr 1.0Nb 0.05Fe | Zr 1.0Nb 0.07Fe | Zr 1.0Nb 0.07Fe | Zr 1.0Nb 0.04Fe | Zr 1.0Nb 0.04Fe |
| O (wt %) | 0.13 | 0.13 | 0.14 | 0.14 | 0.15 | 0.15 | 0.11 | 0.11 |
| S (ppm) | 8 | 8 | 13 | 13 | 32 | 32 | 22 | 22 |
| Quenched | No | No | Yes | Yes | No | No | No | No |
| Initial polishing | SiC roller | SiC roller up to 240 | SiC strip up to 240 | SiC strip | SiC blasting | SiC blasting up to 240 | SiC roller | SiC roller up to 240 |
| Final polishing | SiC roller 240 | Finishing roller | Finishing roller | SiC strip 240 | SiC blasting 240 | Colloidal siliocon (sheet) | SiC roller 120 | Finishing roller |
| Mass increase (mg/cm$^2$) | 15.62 | 11.12 | 9.64 | 11.42 | 15.76 | 9.25 | 22.14 | 12.52 |
| H content (ppm) | 635 | 16 | 13 | 282 | 918 | 15 | 954 | 65 |
| Residence time (s) | 10 000 | 15 000 | 10 000 | 8 600 | 15 000 | 10 000 | 18 000 | 18 000 |
| Ra (μm) | 0.13 | 0.12 | 0.14 | 0.32 | 0.34 | 0.14 | 0.23 | 0.23 |
| Standard deviation on Ra (μm) | 0.01 | 0.01 | 0.02 | 0.02 | 0.01 | 0.01 | 0.00 | 0.01 |
| Rsk | −1.65 | 0.72 | 0.29 | −1.21 | 0.75 | −0.35 | 1.28 | −0.53 |
| Standard deviation on Rsk | 0.06 | 0.88 | 0.48 | 0.79 | 0.64 | 0.97 | 0.89 | 0.78 |
| Rku | 6.32 | 8.71 | 8.96 | 6.08 | 11.55 | 6.91 | 10.32 | 4.69 |
| Standard deviation on Rku | 0.31 | 3.22 | 2.66 | 0.33 | 5.43 | 2.64 | 3.34 | 2.84 |
| Consistent with present disclosure | No | Yes | Yes | No | No | Yes | No | Yes |

Tube 1 is a reference tube (the absolute value of its Rsk is too high), the roughness of which was measured following polishing with silicon carbide rollers of increasing grain (initial mechanical polishing) up to a grain of 240 (final mechanical polishing). It has a roughness Ra substantially sheet impregnated with abrasive paste (colloidal silicon in this example) at the end. The Rku of tube 5 is too high, whilst tube 6 is consistent with the present disclosure.

To confirm the impact of the initial polishing step, the initial polishing of tubes 7 and 8, from a batch with a medium iron content, with silicon carbide rollers of increasing grain was stopped at a grain size of 120. As expected, the duration of the final polishing step with the finishing roller on tube 8 had to be extended in order to obtain a roughness value consistent with the present disclosure, but it was possible. Roughness values consistent with the present disclosure thus do not depend entirely either on the initial polishing step, nor on the characteristics of the instrument used for the final mechanical polishing step. Persons skilled in the art are able to determine experimentally the conditions of the final mechanical polishing step (characteristics of the polishing tool and parameters of its use, coupled with the duration of the polishing step) that will allow the roughness according to the present disclosure to be obtained.

Tube 1's Rsk value is too high, although its Rku value is consistent with the present disclosure and its Ra value is consistent with the present disclosure and substantially equal to that of tube 2. Tube 7's Rsk and Rku values are too high, although its Ra is consistent with the present disclosure and equal to that of tube 8. This clearly shows that the three representative values for the roughness of the tube are not strongly correlated, and that the final mechanical polishing step has a quite particular importance in obtaining the precise roughness configuration according to the present disclosure.

The behaviour of tubes 2, 3, 6, and 8 in table 1 in LOCA testing is shown in FIG. 3. To facilitate the comparison, the results of the samples from FIGS. 1 and 2 were also shown (shaded) in FIG. 3.

For two samples from the same tube as sample 2, the trial was extended to 30,000 and 35,000 s respectively without any breakaway. The corresponding points are shown in FIG. 3.

FIG. 3 also includes the results obtained for tubes 11-19 of table 2 below, the compositions and roughness values of which are described. These tubes are distinguished from those of table 1 by a greater alloy element contet, but their compositions remain consistent with the requirements of the present disclosure. All tubes tested comprised less than 100 ppm C and Hf and less than 1 ppm fluorine. All elements not mentioned are, at most, present in trace amounts.

TABLE 2

Composition, manufacturing variant, mass increase, hydrogene content, and roughness of tubes 11-19

| Tube | 11 | 12 | 13 | 14 | 15 |
|---|---|---|---|---|---|
| Composition | Zr 1.0Nb 0.3Sn 0.1Fe | Zr 2.0Nb 0.2Sn 0.2Fe | Zr 0.8Nb 0.2Sn 0.12Fe | Zr 1.0Nb 0.5Sn 0.1Fe 0.2Cu | Zr 1.8Nb 0.6Sn 0.2Fe 0.1V 0.1Cr |
| O (ppm) | 2248 | 1348 | 1048 | 694 | 1242 |
| S (ppm) | 6 | 26 | 15 | 29 | 19 |
| State | Recrystallised | Semi-recrystallised | Recrystallised | Recrystallised | Recrystallised |
| Pickling | Yes | Yes | No | Yes | Yes |
| Initial polishing | SiC roller 240 | Chemical | SiC roller 240 | SiC strip 240 | SiC strip 240 |
| Final polishing | Finishing roller | Finishing roller | Honing with abrasive paste | Roller burnishing | Finishing roller |
| Mass increase (mg/cm$^2$) | 10.67 | 11.35 | 11.28 | 9.67 | 10.06 |
| H content (ppm) | 16 | 16 | 61 | 18 | 45 |
| Residence time (s) | 10 000 | 15 000 | 18 000 | 10 000 | 10 000 |
| Ra (μm) | 0.16 | 0.12 | 0.12 | 0.14 | 0.15 |
| Rsk | 0.24 | 0.61 | 0.03 | −0.25 | 0.24 |
| Rku | 9.02 | 4.08 | 3.79 | 6.78 | 8.21 |
| Consistent with present disclosure | Yes | Yes | Yes | Yes | Yes |

| Tube | 16 | 17 | 18 | 19 |
|---|---|---|---|---|
| Composition | Zr 2.8Nb 0.4Sn 0.01Fe 0.3Mo | Zr 1.5Nb 0.05Fe | Zr 1.0Nb 0.3Sn 0.1Fe | Zr 1.0Nb 0.3Sn 0.1Fe |
| O (ppm) | 843 | 1129 | 1829 | 1099 |
| S (ppm) | 95 | 55 | 24 | 95 |
| State | Recrystallised | Relieved | Relieved | Semi-recrystallised |
| Pickling | Yes | No | Yes | Yes |
| Initial polishing | Chemical | SiC roller 240 | No | Chemical |

TABLE 2-continued

Composition, manufacturing variant, mass increase, hydrogene content, and roughness of tubes 11-19

| Final polishing | Abrasive paste (felt) | Chemical | Finishing roller | SiC roller 240 |
|---|---|---|---|---|
| Mass increase ($mg/cm^2$) | 12.27 | 13.72 | 12.03 | 16.35 |
| H content (ppm) | 15 | 383 | 82 | 474 |
| Residence time (s) | 15 000 | 10 000 | 18 000 | 15 000 |
| Ra (μm) | 0.12 | 0.08 | 0.11 | 0.38 |
| Rsk | −0.49 | −0.02 | −0.67 | 0.89 |
| Rku | 4.82 | 10.88 | 6.62 | 12.17 |
| Consistent with present disclosure | Yes | No | Yes | No |

Tubes 11, 13, and 17 all underwent the conventional range of initial mechanical polishing with SiC rollers up to a grain size of 240; tubes 14 and 15 underwent initial mechanical polishing with SiC strips up to a grain size of 240, and tubes 12, 16, and 19 initial underwent chemical polishing, and tube 18 did not undergo any initial polishing step. The final polishing step differs, as shown in table 2: chemical polishing or mechanical polishing by various means: finishing roller, abrasion with abrasive paste (colloidal silicon, artificial diamonds, metal oxides of Ti or Zr), roller burnishing. For tube 19, the final mechanical polishing step was polishing with a 240-grain SiC roller, and its Rku is too high to be consistent with the present disclosure. The final chemical polishing of tube 17, not followed by final mechanical polishing, did not allow for an Rku value consistent with the present disclosure. The abrasive paste abrasion methods tested are honing with an abrasive paste containing synthetic diamonds for tube 13, and a felt impregnated with a mixture of metal oxides (Ti and Zr) for tube 16. Other abrasive paste abrasion methods could be used, e.g. milling by abrasive paste extrusion, or without using abrasive paste, as with tube 14 (roller burnishing). Tube 8 directly underwent polishing with a finishing roller following the final thermal treatment. As expected, the duration of the final mechanical polishing with the finishing roller had to be drastically extended in order to obtain the Ra, Rsk, and Rku characteristics required by the present disclosure; thus, the method was poorly suited to industrial application. The examples of table 3 show that roughness values consistent with the present disclosure do not depend on the presence or nature (mechanical or non-mechanical) of initial polishing, and that the final mechanical polishing step may be carried out by various means.

FIG. 3 shows that tubes produced according to the present disclosure, in terms of composition and surface roughness, do not experience breakaway before a duration of exposure to 1000° C. water vapour that is in all cases significantly greater than the 5000 s known from the prior art for similar alloys; see the grey points and the black points located above the regression line in FIG. 3, which correspond, respectively, to the reference samples of FIGS. 1 and 2 and samples 17 and 19 of table 2. In particular, the in the mass increase (corresponding to an acceleration of corrosion) and hydride cracking gradients (hydrogen recovery in excess of 200 ppm) are substantially delayed beyond 10,000 s. No difference in the very clear results can be seen between the various ways of carrying out the final polishing step.

Although it was known that high-temperature oxidation resistance depended on the state of the surface, in particular the absence of fluorine pollution (pollution resulting, e.g., from pickling in a fluoronitric bath) and a controlled roughness Ra value, it was not known that other roughness parameters related to the shape of the peaks and located below threshold values, i.e. Rsk and Rku, could allow for further delays in the kinetic acceleration of oxidation and hydride cracking of the tube in the LOCA context if chosen wisely.

The parameters Rsk and Rsku correspond to an analysis of the roughness measurements carried out with 2D profilometry, i.e., an analysis of the geometric differences of the state of the surface compared to the mean line. In the case of 3D profilometry measurements, the equivalent parameters, Ssk and Sku, may be used, or the analysis may be carried out on one or more generators rather than the surface as a whole.

What is claimed is:

1. A tubular component for a pressurised-water nuclear reactor, having the following composition by weight:

0.8%≤Nb≤2.8%;

traces≤Sn≤0.65%;

0.015%≤Fe≤0.40%;

traces≤C≤100 ppm;

−600 ppm≤O≤2300 ppm;

−5 ppm≤S≤100 ppm;

traces≤Cr+V+Mo+Cu≤0.35%;

traces≤Hf≤100 ppm;

F≤1 ppm;

a remainder being zirconium and impurities resulting from production, an outer surface of which has a roughness Ra less than or equal to 0.5 μm, obtained following a final mechanical polishing step, the outer surface having a roughness Rsk≤1 in absolute value and a roughness Rku≤10;

wherein the tubular component is configured such that a breakaway of the tubular component does not take place before at least 10000 seconds when the tubular component is submitted to steam corrosion at 1000° C. and atmospheric pressure.

2. The tubular component for a pressurised-water nuclear reactor according to claim 1, wherein the outer surface has a roughness Ra less than or equal to 0.3 μm, obtained following the final mechanical polishing step.

3. The tubular component for a pressurised-water nuclear reactor according to claim 1, wherein the outer surface has a roughness Rsk≤0.75 in an absolute value and a roughness Rku≤9.

4. A method for producing a fuel cladding tube for a nuclear reactor, comprising:

preparing a zirconium-alloy ingot having the following composition by weight:

0.8%≤Nb≤2.8%;

traces≤Sn≤0.65%;

0.015%≤Fe≤0.40%;

traces≤C≤100 ppm;

600 ppm≤O≤2300 ppm;

5 ppm≤S≤100 ppm;

traces≤Cr+V+Mo+Cu≤0.35%;

traces≤Hf≤100 ppm;

F≤1 ppm;

a remainder being zirconium and impurities resulting from production;

subjecting the ingot to forging, optionally followed by quenching, then to extrusion and thermomechanical treatments including cold rolling separated by intermediate annealings, wherein all of the intermediate annealings are carried out at a temperature below the transus temperature→α+β of the alloy, ending with a relief, semi-recrystallization or recrystallization annealing, and resulting in a production of a tube;

optionally, carrying out chemical pickling and/or electrolytic polishing and/or initial mechanical polishing of an outer surface of the tube; and carrying out a final mechanical polishing of the outer surface to give the outer surface a roughness Ra less than or equal to 0.5 μm, a roughness Rsk≤1 in absolute value and a roughness Rku≤10;

wherein the fuel cladding tube is configured such that a breakaway of the fuel cladding tube does not take place before at least 10000 seconds when the fuel cladding tube is submitted to steam corrosion at 1000° C. and atmospheric pressure.

5. The method according to claim 4, wherein the intermediate annealings are carried out at temperatures less than or equal to 600° C.

6. The method according to claim 4, wherein the final mechanical polishing is carried out with a finishing roller.

7. The method according to claim 4, wherein the final mechanical polishing is carried out by abrasion with an abrasive paste.

8. The method according to claim 7, wherein the final mechanical polishing is carried out by a method selected from: honing, abrasive paste extrusion, abrasion using a polishing felt or sheet impregnated with abrasive paste.

9. The method according to claim 4, wherein the final mechanical polishing is carried out by roller burnishing.

10. The tubular component for a pressurised-water nuclear reactor according to claim 1, wherein the tubular component is configured such that the tubular component has a hydrogen content of 200 ppm or less when the tubular component is submitted to steam corrosion at 1000° C. and atmospheric pressure for 10000 seconds.

11. The tubular component for a pressurised-water nuclear reactor according to claim 1, wherein the tubular component is configured such that a kinetic acceleration of oxidation on the tubular component does not take place before at least 10000 seconds when the tubular component is submitted to steam corrosion at 1000° C. and atmospheric pressure.

12. The tubular component for a pressurised-water nuclear reactor according to claim 1, wherein the tubular component is configured such that an increase in a mass of the tubular component resulting from oxidation is 10.67 $mg/cm^2$ or less when the tubular component is submitted to steam corrosion at 1000° C. and atmospheric pressure for 10000 seconds.

13. The method according to claim 4, wherein the fuel cladding tube is configured such that the fuel cladding tube has a hydrogen content of 200 ppm or less when the fuel cladding tube is submitted to steam corrosion at 1000° C. and atmospheric pressure for 10000 seconds.

14. The method according to claim 4, wherein the tubular component is configured such that a kinetic acceleration of oxidation on the tubular component does not take place before at least 10000 seconds when the tubular component is submitted to steam corrosion at 1000° C. and atmospheric pressure.

15. The method according to claim 4, wherein the fuel cladding tube is configured such that an increase in a mass of the fuel cladding tube resulting from oxidation is 10.67 $mg/cm^2$ or less when the fuel cladding tube is submitted to steam corrosion at 1000° C. and atmospheric pressure for 10000 seconds.

16. A tubular component for a pressurised-water nuclear reactor, having the following composition by weight:

0.8%≤Nb≤2.8%;

traces≤Sn≤0.65%;

0.015%≤Fe≤0.40%;

traces≤C≤100 ppm;

−600 ppm≤O≤2300 ppm;

−5 ppm≤S≤100 ppm;

traces≤Cr+V+Mo+Cu≤0.35%;

traces≤Hf≤100 ppm;

F≤1 ppm;

a remainder being zirconium and impurities resulting from production, an outer surface of which has a roughness Ra less than or equal to 0.5 μm, obtained following a final mechanical polishing step, the outer surface having a roughness Rsk≤1 in absolute value and a roughness Rku≤10;

wherein the tubular component is configured such that an increase in a mass of the tubular component resulting from oxidation is 10.67 $mg/cm^2$ or less when the tubular component is submitted to steam corrosion at 1000° C. and atmospheric pressure for 10000 seconds.

17. The tubular component for a pressurised-water nuclear reactor according to claim 16, wherein the outer surface has a roughness Ra less than or equal to 0.3 μm, obtained following the final mechanical polishing step.

18. The tubular component for a pressurised-water nuclear reactor according to claim 16, wherein the outer surface has a roughness Rsk≤0.75 in an absolute value and a roughness Rku≤9.

19. The tubular component for a pressurised-water nuclear reactor according to claim 16, wherein the tubular component is configured such that the tubular component has a hydrogen content of 200 ppm or less when the tubular component is submitted to steam corrosion at 1000° C. and atmospheric pressure for 10000 seconds.

20. The tubular component for a pressurised-water nuclear reactor according to claim 16, wherein the tubular component is configured such that a kinetic acceleration of oxidation on the tubular component does not take place before at least 10000 seconds when the tubular component is submitted to steam corrosion at 1000° C. and atmospheric pressure.

* * * * *